Sept. 30, 1952  C. S. SZEGHO ET AL  2,612,612
CATHODE-RAY TUBE
Filed June 23, 1950

CONSTANTIN S. SZEGHO
MARK E. AMDURSKY
WILLIAM O. REED
*INVENTORS.*

BY *Francis W. Crotty*
THEIR ATTORNEY

Patented Sept. 30, 1952

2,612,612

UNITED STATES PATENT OFFICE 2,612,612

CATHODE-RAY TUBE

Constantin S. Szegho, Mark E. Amdursky, and William O. Reed, Chicago, Ill., assignors to The Rauland Corporation, a corporation of Illinois Application June 23, 1950, Serial No. 169,997

3 Claims. (Cl. 250—80)

This invention relates to image-reproducing devices and more particularly to such devices of the type which comprise a fluorescent screen supported adjacent a glass viewing plate, as in cathode-ray picture tubes and the like.

Conventional cathode-ray picture tubes used in present-day television receivers provide image reproduction which is generally recognized as superior to that obtainable with other types of image-reproducing device. However, the polished surface of the viewing plate of a present-day picture tube is a source of undesirable specular reflection, to such an extent that external light from floor lamps and the like produces a specular image which detracts from the quality of the reproduced picture. It has been suggested that undesirable specular reflection may be reduced by coating the glass viewing plate with a plastic light diffusing substance, but while this scheme has materially reduced the amount of specular reflection, it has been found that such a plastic coating is not sufficiently rugged and durable to warrant its use on a commercial basis. It is also known that glare from a glass article, caused by reflection of external light, may be reduced by providing the surface of the article with a skeletonized coating of substantially one-quarter wavelength in thickness; this expedient is impractical for application to a television picture tube because such a skeletonized coating is color-selective to reflected light. Moreover, the schemes known in the prior art for reducing glare have also been found to cause such a reduction in picture definition as to make them unacceptable for general use.

It is a primary object of the present invention to provide a new and improved image-reproducing device in which specular reflection of external light is materially reduced without substantially detracting from the picture resolution.

It is a further object of the invention to provide a new and improved cathode-ray picture tube, of the type comprising a fluorescent screen supported adjacent a glass viewing plate, in which specular reflection of external light from the surface of the glass viewing plate is so reduced as to be practically unnoticeable, thereby providing an increased contrast range, without any substantial sacrifice in picture detail.

An image-reproducing device constructed in accordance with the present invention comprises a fluorescent screen supported adjacent a glass viewing plate at least one surface of which comprises a multitude of microscopic nodular protuberances individually of from 5 to 20 microns in height and from 5 to 100 microns in diameter. Such a glass viewing plate is characterized by a reflectivity, measured at an angle of reflection substantially equal to the angle of incidence of a collimated beam of light directed at the external surface of the viewing plate at an angle of approximately 35 degrees from normal, within the range from 1.5 per cent to 4 per cent of that of a mirror surface.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1:
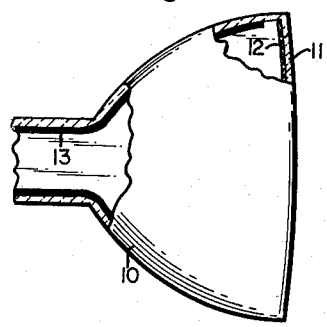
Figure 1 is a fragmentary side-elevational view, partly in section, of an image-reproducing device constructed in accordance with the invention.

The cathode-ray picture tube of Figure 1 comprises a glass envelope 10 having a glass viewing plate 11 adjacent the inner surface of which is supported a fluorescent screen 12; preferably, fluorescent screen 12 is affixed to the inner surface of viewing plate 11. An electron gun (not shown) or other suitable means is provided for exciting fluorescent screen 12 in accordance with a received signal in order to reproduce the image represented thereby. A conductive coating 13 may be provided on the inner side walls of the envelope 10 to serve as a final anode for the beam-projecting system, and a suitable contact terminal (not shown) may be provided to permit connection of conductive coating 13 in an external circuit.

The image-reproducing device of Figure 1 is entirely conventional in all respects with the exception of the construction of glass viewing plate 11. In accordance with the invention, at least the outer surface of glass viewing plate 11 is provided with a multitude of microscopic nodular protuberances, in order to reduce the reflectivity of the viewing plate. The appearance to the naked eye of a face plate constructed in accordance with the invention is smooth and somewhat cloudy, but not so cloudy as to be opaque. However, when viewed under a high-powered microscope, a rather uniform distribution of minute convex or nodular hills or protuberances may be discerned, as shown in Figures 2 and 3.

Figure 2:
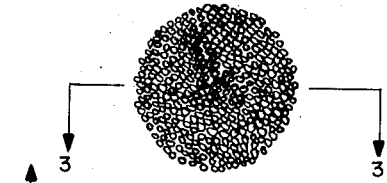
Figure 2 is a plan view, greatly enlarged, of a portion of the glass viewing plate of the device of Figure 1 as seen under a microscope.
Figure 3:
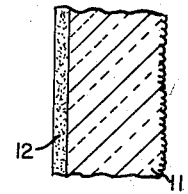
Figure 3 is a cross-sectional view taken along the line 3—3 of Figure 2.

Thus, the outer surface of viewing plate 11 is relieved, or placed in relief, in accordance with the representation of Figure 2, and specular reflection of light from external sources is materially reduced, in comparison with that which would be obtained with a polished surface, by scattering and diffuse reflection. Generally, the greater the height of the individual protuberances and the smaller the diameter, the greater the reduction in reflectivity. However, as the reflectivity is reduced with a consequent increase in the scattering of transmitted light, the resolving power of the face plate with respect to a light originating at fluorescent screen 12 is also reduced, and if the process is carried too far, the resulting loss in picture definition can be excessive.

In accordance with the present invention, it has been found that if the microscopic nodular protuberances on the outer surface of glass face plate 11 are individually within the range from 5 to 20 microns in height and from 25 to 100 microns in diameter, the sacrifice in picture definition is so slight as to be negligible for all practical purposes. Such a face plate is able to resolve at least 2.2 lines per millimeter, which is approximately 4.5 television scanning lines per millimeter and is quite acceptable in accordance with present television practice.

At the same time, however, the reflectivity with respect to light from external sources is materially reduced. As measured with respect to a collimated beam of light directed at the external surface of the viewing plate at an angle of approximately 35 degrees from normal incidence, the reflectivity (measured at an angle of reflection equal to the angle of incidence) of a cathode-ray tube viewing plate constructed in accordance with the invention has been found to lie within the range from 2 per cent to 4 per cent of that of a mirror surface or perfect reflector, as compared to a figure of substantially 7 per cent for a tube having a polished neutral-tinted filter face plate of approximately 66% transmission as now commonly used or about 9 per cent for a tube having a clear window glass face plate. Moreover, it has been found that the picture definition is correlated with the reflectivity so that all face plates which exhibit diffuse reflection and have a reflectivity (measured in the described manner) within the specified range are acceptable as regards picture detail, while those lying outside the specified range are characterized either by too great a loss of picture detail or by an insufficient reduction in reflectivity.

The desired surface condition may be achieved in accordance with any of a number of processes. For example, the outer surface of the viewing plate may be roughened by liquid honing or vapor blasting, after which the outer surface is subjected to the chemical action of hydrofluoric acid until a reflectivity within the specified range is obtained. This process is specifically disclosed and claimed in the copending application of Constantin S. Szegho et al., Serial No. 169,998, filed concurrently herewith, for Process for Producing Low-Glare Cathode-Ray Tube Viewing Plates, assigned to the present assignee. Another process which has been successfully employed comprises the steps of frost etching the outer surface (with a commercial frost etch composition comprising ammonium bifluoride as an active ingredient) to render the surface matte, and subsequently etching with hydrofluoric acid. Still another process which may be employed comprises the steps of fusing a ceramic frit into the outer surface of the viewing plate and subsequently etching with hydrofluoric acid until a reflectivity within the specified range is obtained. Whatever the process used, it has been found that whenever the face plate exhibits diffuse reflection and the reflectivity falls within the range specified above, the loss of picture definition is so small as to be negligible. When the reflectivity is below the range specified, the loss of picture detail is excessive, while reflectivities above the specified range do not provide a sufficient reduction in glare to warrant the expense of the process.

Figure 4:
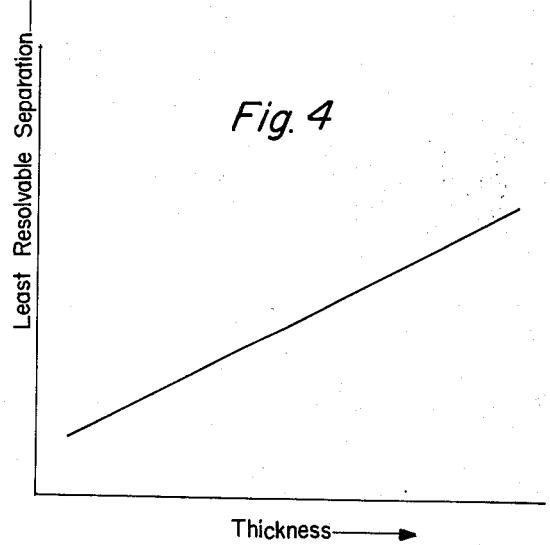
Figure 4 is a graphical representation useful in understanding the invention.

It has also been found that, for any given value of reflectivity, the picture definition is substantially an inverse linear function of the face plate thickness. This relationship is graphically illustrated in Figure 4, in which the least resolvable separation is plotted as a function of the thickness of the viewing plate, reflectivity being maintained constant. Thus it is apparent that, for a predetermined picture definition, higher reflectivities are required for thicker face plates.

Glass-bulb cathode-ray tubes are characterized by a variation in face plate thickness, the viewing plate having an appreciably greater thickness at the periphery than at the center. Accordingly, in order to obtain acceptable picture definition at the edges of the screen, it is necessary to provide a higher reflectivity than would be necessary if only the center of the screen were to be considered.

The ranges specified for reflectivity, and for the height and diameter of the individual microscopic nodules appearing on the viewing plate surface, are those which have been found acceptable for use in connection with glass-bulb cathode-ray picture tubes. Lower and more narrow limits may be maintained in the production of metal-cone tubes, since the quality of the glass used in the viewing plate is better and more uniform, and since the viewing plate thickness is generally less and more constant, than in the case of the glass-bulb tubes. Thus, the reflectivity of the viewing plate of a metal-cone tube constructed in accordance with the invention may be maintained within the range from 1.0 per cent to 2 per cent of that of a mirror surface, thereby permitting greater uniformity in production and a greater reduction in glare. In order to obtain reflectivity readings within this latter range, it has been found that the microscopic nodular protuberances on the surface must be from 5 to 20 microns in height and from 5 to 25 microns in diameter.

Thus, the present invention provides a new and improved image-reproducing device, and more particularly a novel cathode-ray picture tube, which affords a substantial reduction in glare from external light sources without materially sacrificing picture detail. The correlation between reflectivity and picture definition which has been observed appears to hold without regard for the process with which the viewing plate is treated. This finding facilitates large scale inspection of the treated tubes to determine in advance whether or not the required picture definition may be obtained.

While particular embodiments of the present invention have been shown and described, it is apparent that various changes and modifications may be made, and it is therefore contemplated in the appended claims to cover all such changes and modifications as fall within the true spirit and scope of the invention.

We claim:

1. An image-reproducing device comprising a fluorescent screen supported adjacent a glass viewing plate at least one surface of which comprises a multitude of integral microscopic nodular protuberances individually of from 5 to 20 microns in height and from 5 to 100 microns in diameter.

2. An image-reproducing device comprising a fluorescent screen supported adjacent a glass viewing plate at least one surface of which comprises a multitude of integral microscopic nodular protuberances individually of from 5 to 20 microns in height and from 5 to 25 microns in diameter.

3. An image-reproducing device comprising a fluorescent screen supported adjacent the inner surface of a glass viewing plate the outer surface of which comprises a multitude of integral microscopic nodular protuberances individually of from 5 to 20 microns in height and from 5 to 100 microns in diameter.

CONSTANTIN S. SZEGHO.
MARK E. AMDURSKY.
WILLIAM O. REED.

REFERENCES CITED

The following references are of record in the file of this patent:

UNITED STATES PATENTS

| Number | Name | Date |
| --- | --- | --- |
| 1,176,746 | Federico | Mar. 28, 1916 |
| 1,491,830 | Troeger | Apr. 29, 1924 |
| 1,942,841 | Shimizu | Jan. 9, 1934 |
| 2,090,922 | Von Ardenne | Aug. 24, 1937 |
| 2,091,152 | Malpica | Aug. 24, 1937 |
| 2,169,838 | Herbst | Aug. 15, 1939 |
| 2,197,625 | Teves et al. | Apr. 16, 1940 |
| 2,201,245 | Ruska et al. | May 21, 1940 |
| 2,222,414 | Kudar | Nov. 19, 1940 |
| 2,289,978 | Malter | July 14, 1942 |
| 2,388,203 | Zindel, Jr. | Oct. 30, 1945 |
| 2,419,177 | Steadman | Apr. 15, 1947 |
| 2,473,825 | Smith | June 21, 1949 |
| 2,485,561 | Burroughs | Oct. 25, 1949 |